UNITED STATES PATENT OFFICE.

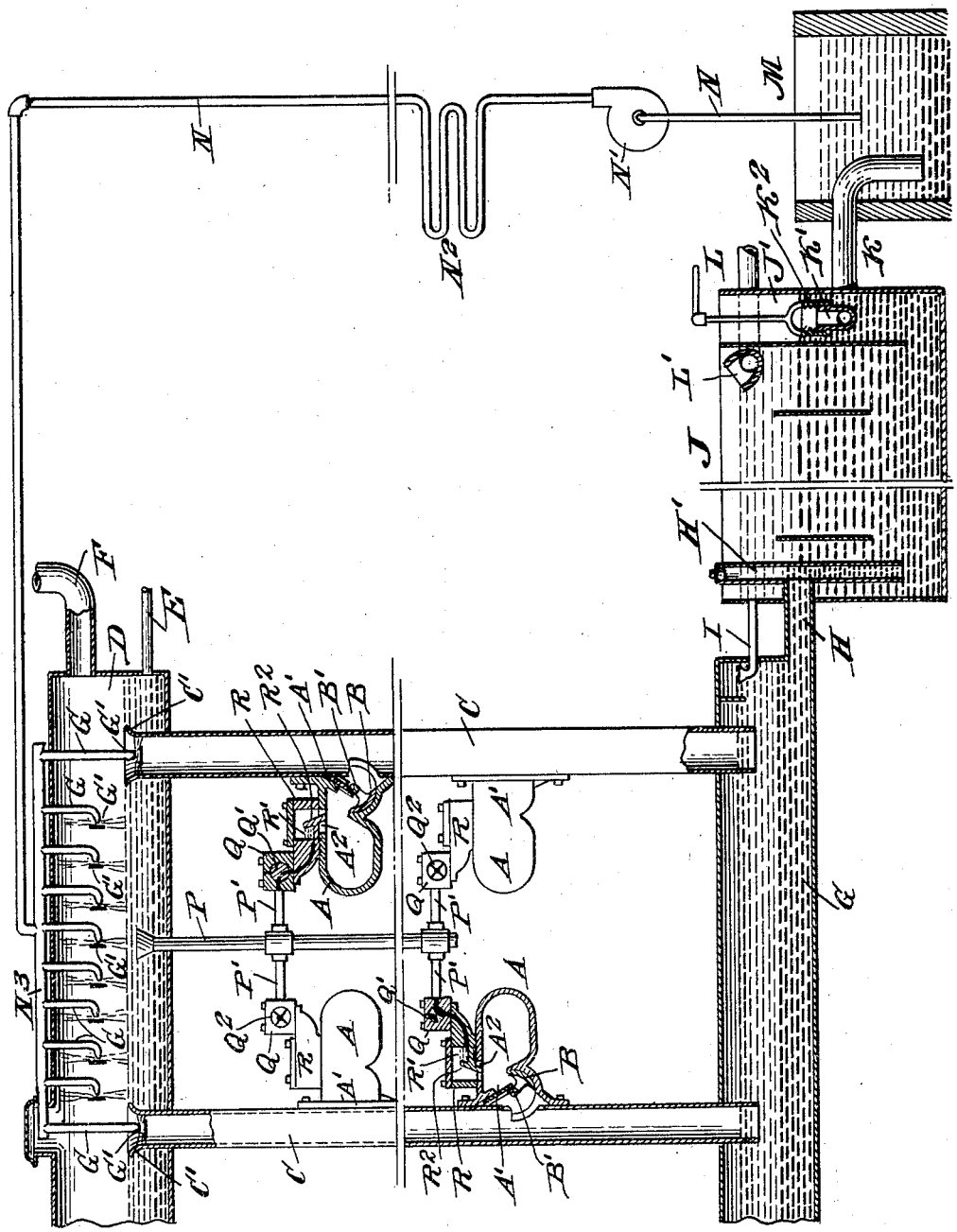

ARTHUR W. WARNER, OF MEDIA, PENNSYLVANIA, ASSIGNOR TO THE AMERICAN GAS COMPANY OF NEW JERSEY, OF CAMDEN, NEW JERSEY, A CORPORATION OF NEW JERSEY.

METHOD AND APPARATUS FOR COOLING GAS.

1,362,207.      Specification of Letters Patent.      Patented Dec. 14, 1920.

Application filed November 2, 1918. Serial No. 260,840.

*To all whom it may concern:*

Be it known that I, ARTHUR W. WARNER, a citizen of the United States of America, and resident of Media, in the county of Delaware and State of Pennsylvania, have invented a certain new and useful Improvement in Methods and Apparatus for Cooling Gas, of which the following is a true and exact description, reference being had to the accompanying drawings, which form a part thereof.

My invention relates to the manufacture of gas in gas manufacturing systems comprising a series of retorts connected in groups to standpipes, and connected through said standpipes to a cooling main, and usually also to a separate hydraulic main; and my object is to provide a method and apparatus for cooling the hot gas issuing from the retorts and passing through the standpipes and cooling main progressively, and so as to avoid the building up of obstructions in the retort outlets and standpipes due to deposits of lamp black and baking of deposited tar, and to avoid also too rapid a cooling of the gas in the cooling main, and to effect these purposes with the use of the least possible apparatus and by the repeated use of the ammonia liquor collected in the mains.

My method of cooling the gas consists in injecting a portion of the cooling liquid into the lateral outlets from the retorts to the standpipes, further cooling the gas by cooling liquid flowing into and through the standpipes, and still further cooling the gas by spraying cooling fluid through it in the cooling main. By preference I cool the gases before they reach the standpipes to about 200° F.; further reduce their temperature while flowing through the standpipes to about 160° F., and further reduce their temperature in the cooling main to about 115° F., at which temperature it is customary to deliver the gases to the by-products apparatus.

My method of evolving the gases also involves by preference the use and reuse, as a cooling liquid, of the ammonia liquor collected in the mains and cooled to an efficient temperature, and more specifically the use of cooled ammonia liquor for the sprays in the cooling main and of the warmer liquid collected in the cooling main for use in cooling the gases at the retort laterals opening into the standpipes. The cooling ammonia liquor used in the standpipes may be drawn from the cooling main or from the cooled ammonia liquor or from both sources.

My invention will be best understood in detail as described in connection with the drawing which is of a diagrammatic general character showing the devices I have devised for carrying my new method into effect, and which also form a part of my invention. In this drawing AA, etc., indicate retorts in which the gas is driven off from coal at high temperatures. The specific retorts shown are formed with downwardly inclined lateral outlets A' opening into the standpipe, and formed with a transverse slot $A^2$ at their tops for the passage of a film or spray of cooling fluid to be injected into the laterals to cool the issuing hot gases. B is a swinging cup-like dam, which, when swung outwardly, forms with the bottom of the lateral, a cup to retain the liquid and form, in connection with a downwardly extending partition B', a liquid seal to cut off connection between the retort and standpipe. This specific construction of the water sealing devices, and also the construction to be hereafter described of the device for feeding liquid to the lateral form the subject matter of my copending application for Letters Patent filed November 2, 1918, Serial No. 260839, and are only shown here as constituting a preferred detail of construction for my described apparatus. CC are standpipes to which the retorts are connected in groups and which open at bottom into the hydraulic main G, and at top into the cooling main D. The top edges C' of the standpipes limit the liquid level in the main. E is a conduit by which tar and heavy material can be drawn from the main D, and F is a conduit through which the gases can be drawn to by-product apparatus and for storage. J is a decanter into which the ammonia liquor and tar from main G pass through conduits I, and H, H' the tar rising in the well J' flows over an adjustable mouth piece K² into the mouth piece K' of a conduit K, which leads into a well M, and the ammonia liquor is drawn off through an adjustable mouthpiece L' through a conduit L; also, as shown, into well M. N is a conduit leading from well M to a header N³, the ammonia liquor being drawn through it by a pump N' and forced through cooling coils N² to reduce its temperature to the desired point. The cooled ammonia liquor is forced from the header N³ through pipes G to spraying devices G', located in the cooling main and such spraying devices may be, as shown, extended into the mouths of the standpipes.

P is a conduit the upper end of which, as shown, extends into the cooling main opening below the fluid level therein. Branches P' P', etc., lead from this pipe to the laterals of the retorts, and, as shown, first into valve boxes Q, having a valve Q' with two ports by connecting which with the ports in the box a greater or smaller flow of ammonia liquor can be permitted. The port from the valve box opens into a weir chamber R' in a casing R, and the ammonia liquor flows over a weir R², through slot A², and into the lateral A' in the form of a flat film.

The gases issuing from the retorts are cooled in the laterals by the liquid flowing across them; still further cooled in the standpipes by the liquor flowing over their edges C' from the cooling main or by sprays, as shown, and the final cooling takes place in the cooling main by the action of the liquor sprays G'.

The ammonia liquor flowing from the cooling main and laterals is collected in the main G separated from the tar in the decanter J and well M; cooled in the cooling devices indicated by coil N² and returned through header N³ for further use in the cooling main as described.

Having now described my invention, what I claim as new and desire to secure by Letters Patent, is:

1. In a gas manufacturing system comprising a series of retorts connected in groups to standpipes and a cooling main into which the standpipes open, the method of cooling the gas which consists of passing the gas as it leaves the individual retorts and before it enters the standpipe through a shower of cooling fluid, further cooling the gas by contact with cooling fluid in the standpipe and completing its cooling to the desired temperature by showering cooling fluid through it in the cooling main.

2. In a gas manufacturing system comprising a series of retorts connected in groups to standpipes and a cooling main into which the standpipes open, the method of cooling the gas which consists of passing the gas as it leaves the individual retorts and before it enters the standpipe through a shower of ammoniacal liquor, further cooling the gas by contact with ammoniacal liquor in the standpipe and completing the cooling to the desired temperature by showering ammoniacal liquor through it in the cooling main.

3. In a gas manufacturing system comprising a series of retorts connected in groups through lateral conduits to standpipes and a cooling main into which the standpipes open, means for cooling the gas consisting of means for showering cooling fluid into the lateral conduits of the retorts to cool the gas before it enters the standpipes in combination with means for flowing the cooling fluid through the standpipes and means for showering the cooling fluid through the gas in the cooling main.

4. In a gas manufacturing system comprising a series of retorts connected in groups through lateral conduits to standpipes, a cooling main into which the standpipes open at top, a hydraulic main into which they open at bottom and means for separating the ammonia liquor from the tar, means for cooling the gas consisting of means for showering liquid into the lateral conduits leading from the individual retorts, said means being connected to a reservoir of ammonia liquor, in combination with means for showering liquid through the gas in the cooling main also connected to a reservoir of ammonia liquor and means for feeding liquid into the standpipes from an ammonia liquor reservoir.

5. In a gas manufacturing system comprising a series of retorts connected in groups through lateral conduits to standpipes, a cooling main into which the standpipes open at top, a hydraulic main into which they open at bottom and means for separating the ammonia liquor from the tar, means for cooling the gas consisting of means for showering liquid into the lateral conduits leading from the individual retorts, said means being connected to and supplied from the ammonia liquid in the cooling main, in combination with means for showering liquor through the gas in the cooling main connected to a reservoir for ammonia liquor, and means for feeding liquid into the standpipes from an ammonia liquor reservoir.

6. In a gas manufacturing system comprising a series of retorts connected in groups through lateral conduits to standpipes, a cooling main into which the standpipes open at top, a hydraulic main into which they open at bottom and means for separating the ammonia liquor from the tar, means for cooling the gas consisting of means for showering liquid into the lateral conduits leading from the individual retorts, said means being connected to and supplied from the ammonia liquid in the cooling main, in combination with means for showering liquor through the gas in the cooling main connected to a reservoir for ammonia liquor, means for feeding liquid into the standpipes from an ammonia liquor reservoir, and means for collecting and cooling the ammonia liquor used in cooling the gas and collected in the main preparatory to its repeated use.

ARTHUR W. WARNER.